United States Patent
Kim et al.

[11] Patent Number: 5,937,135
[45] Date of Patent: Aug. 10, 1999

[54] TAPE-INDEPENDENT VIDEO SIGNAL RECORDING AND REPRODUCING APPARATUS

[75] Inventors: Yung Gil Kim, Seoul; Yong Hoo Sheen; Joong Kwon Joh, both of Kyungki-Do; Jae Ryong Kim, Seoul; Sang Joon Woo, Kyungki-Do; Dong Hwa Lee, Seoul; Man Chul Choi, Seoul; Je Hyoung Lee, Seoul; Tae Kyung Kwon, Kyungki-Do; Sang Mun Lee; Tae Suck Bark, both of Seoul; Doo Hee Lee, Kyungki-Do; Kyoung Il Min, Seoul; Soon Ki Lim, Seoul; Tae Joon Park, Seoul, all of Rep. of Korea

[73] Assignee: LG Electronics Inc., Rep. of Korea

[21] Appl. No.: 08/760,990

[22] Filed: Dec. 5, 1996

[30] Foreign Application Priority Data

Feb. 5, 1996 [KR] Rep. of Korea .................... 2724/1996

[51] Int. Cl.⁶ ............................... H04N 5/91; H04N 7/00
[52] U.S. Cl. .................................. 386/46; 386/94; 360/69
[58] Field of Search .................................. 386/1, 35, 40, 386/46, 95, 108, 113, 124; 360/27, 32, 60, 69, 94, 51, 73.02, 73.05, 73.07, 73.08

[56] References Cited

U.S. PATENT DOCUMENTS 5,499,145 3/1996 Azuma et al. ...................... 360/33.1
5,587,848 12/1996 Shimotashiro et al. .............. 360/46

*Primary Examiner*—Wendy Garber
*Assistant Examiner*—Christopher Onuaku
*Attorney, Agent, or Firm*—Ostrolenk, Faber, Gerb & Soffen, LLP

[57] ABSTRACT

An improved video signal recording and reproducing apparatus for a digital video cassette tape recorder by which it is possible to divide, record and reproduce a digital video signal on a low density video tape into multiple tracks based on the amount of data recordable on one track of a high density video tape by controlling a recording/reproducing speed and a tape running speed in accordance with a judgement of the type of the video tape having a predetermined recordable wavelength. The apparatus includes a detector for detecting the type of the video tape in accordance with a recordable wavelength of the video tape, a judgement section for judging the type of the tape by receiving a detected tape type signal from the detector, and a controller for controlling a recording and reproducing speed in accordance with the judged tape type.

20 Claims, 4 Drawing Sheets

TAPE-INDEPENDENT VIDEO SIGNAL RECORDING AND REPRODUCING APPARATUS

BACKGROUND OF THE INVENTION

1. Field of the Invention

The present invention relates to a video signal recording and reproducing apparatus for a digital video cassette tape recorder (DVCR), and particularly to an improved video signal recording and reproducing apparatus for a DVCR which is capable of dividing, recording and reproducing a digital signal outputted from the same source onto multiple tracks based on the amount of data recorded on one track by controlling a recording/reproducing speed and a tape running speed in accordance with a judgement result after judging the type of video tape having a predetermined recordable wavelength.

2. Description of the Conventional Art

Generally, a digital video cassette tape recorder (DVCR) is directed to recording a digital signal from a digital broadcast source such as an advanced television system, a cable TV decoder, or a satellite broadcast signal receiver onto a video tape which is referred to as a magnetic recording medium and to reproducing the recorded digital signal.

The DVCR includes an integrated receiver decoder (IRD), which is referred to as an exclusive receiver, for receiving the digital signal broadcast from the digital broadcast source, and thus recording the received digital signal onto a video tape using a video signal processing means, and for reproducing the recorded digital signal.

Figure 1:
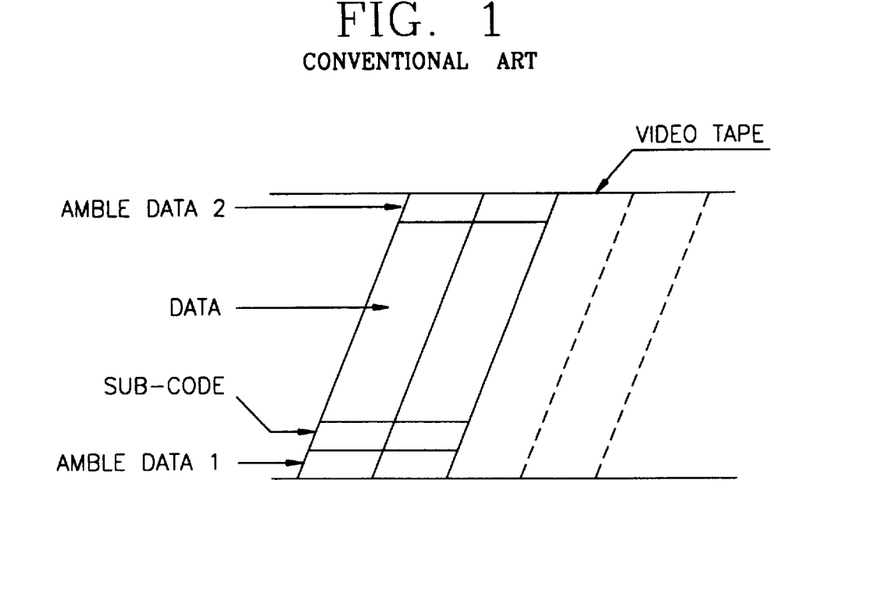
FIG. 1 is a diagram showing a recording pattern of a digital video signal on a video tape in a conventional DVHS-VCR.

In addition, a digital VHS VCR (DVHS-VCR) is directed to recording digital signals onto a video tape in a recording pattern as shown in FIG. 1 and reproducing the recorded digital signals.

Here, one track on the tape includes a first preamble data region which is recorded at the start portion of each track and indicates the start of the track, a sub-code region contains certain information referred to for a recording/reproducing operation, a main data region which contains a video information, and a second preamble data region which is recorded at the end portion of each track and indicates the end of the track.

The above-mentioned digital signal is received through the IRD (not shown). A format unit formats the video signal. A signal processor modulates the signal, and then the signal is recorded onto the video tape in the pattern as shown in FIG. 1. The signal reproduced from the video tape is demodulated by the signal processor, and de-formatted by the format unit and then is outputted. Here, the rotation speed of a head drum in the recording/reproducing mode is 1800 rpm which is the same as in the conventional VHS format mode.

Here, the digital tape, that is, a super VHS (SVHS) tape, is generally used, which has a recording wavelength of 0.8 $\mu$m rather than 1.4 $\mu$m of the normal VHS tape so as to more effectively record/reproduce more digital information thereon without recording/reproducing loss and noise as compared with an analog video signal.

Figure 2:
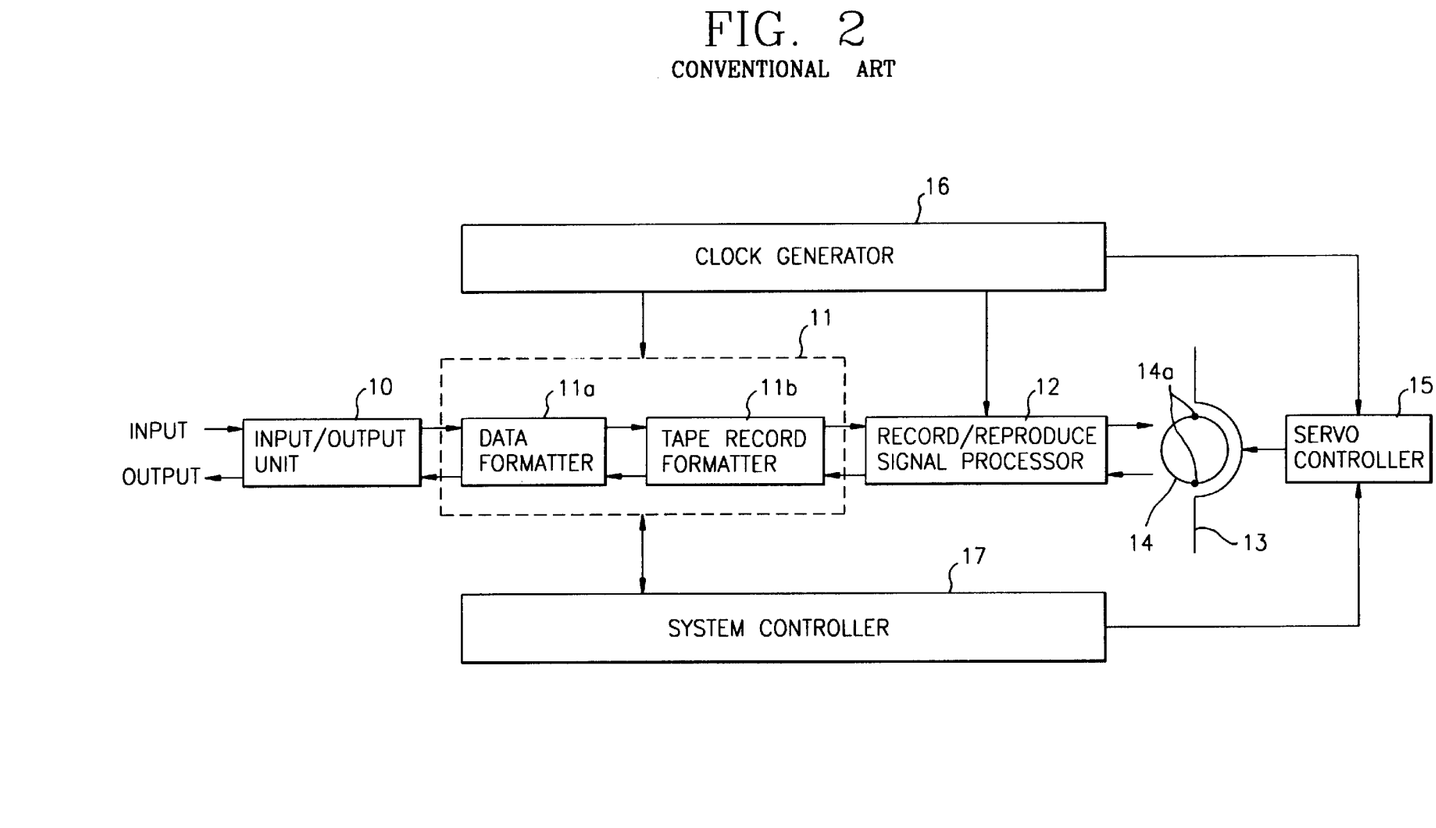
FIG. 2 is a block diagram showing the construction of a video signal recording/reproducing apparatus of a conventional DVHS-VCR.

FIG. 2 shows a video signal recording/reproducing apparatus of a conventional DVHS VCR, which includes an input/output unit 10 connected to an IRD for receiving a digital signal and for outputting a reproduced digital signal, a format formation unit 11 including a data formatter unit 11a connected to the input/output unit 10 for formatting an error correction code of the data and a tape recording formatter unit 11b connected to the data formatter unit 11a for forming the formatted data into a recording format on the video tape, a recording/reproducing signal processor 12 connected to the format formation unit 11 for performing the record signal processing and the reproduce signal processing including modulation and demodulation of the digital signal, a head drum 13 provided with a video head 14a for recording the recording signal outputted from the recording/reproducing signal processor 12 onto the video tape 13, and for reproducing the digital signal recorded on the video tape 13 and outputting the reproduced signal to the recording/reproducing signal processor 12, a servo controller 15 for controlling the running of the video tape 13 and the rotation of the head drum 14, a clock generator 16 for outputting a format clock signal to the format formation unit 11, and a clock signal, which is necessary to record and reproduce the digital signal, to the recording/reproducing signal processor 12, and a reference clock signal to the servo control to the servo controller 15, and a system controller 17 for controlling the data formatting process of the format formation unit 11 and the operation of the servo controller 15.

The operation of the video signal recording/reproducing apparatus of a conventional DVHS VCR will now be explained with reference to FIG. 2.

To begin with, the operation of the video signal recording and reproducing apparatus in the recording mode will first be explained.

The digital signal transmitted from the digital broadcast source is received through the IRD (not shown), and then inputted to the data formatter unit 11a of the format formation unit 11 through the input/output unit 10.

The data formatter unit 11a corrects the errors in the inputted digital signal, generates an additional information (a sub-code) to be recorded as shown in FIG. 1, and then outputs the data to the tape recording formatter unit 11b, and the tape recording format for unit 11b changes the inputted digital signal into a pattern to be recorded on the video tape 13, generates the recording timing and then outputs the signal to the recording/reproducing signal processor 14.

Here, the format formation unit 11 receives the clock signal, which is necessary to form a format, from the clock generator 16 and a driving clock signal and a control signal (generation and reading of an additional data) from the system controller 17, performs a data process, and then outputs the formatted digital video signal to the recording/reproducing signal processor 12. The recording/reproducing signal processor 12 performs a record processing of the digital signal inputted thereto in accordance with the recording clock signal outputted from the clock generator 16 and transmits the processed signal to the video head 14a of the head drum 14.

The servo controller 15 controls the running of the video tape 13 and the rotation of the head drum 14. In the case of the DVHS VCR, the head drum 14 is rotated at 1800 rpm like in the VHS VCR. The digital signal is recorded on the S-VHS tape 13 in the pattern as shown in FIG. 1.

The operation of the video signal recording/reproducing apparatus of the DVHS VCR as shown in FIG. 2 in the reproducing mode is performed in reversed order to the recording mode.

That is, the video tape 13 is normally transported in accordance with a control of the servo controller 15. The head drum 14 is rotated at 1800 rpm, and the digital signal recorded on the video tape 13 is reproduced in cooperation with the video head 14a.

The reproduced recorded digital signal is reproduce-processed by the recording/reproducing signal processor 12, and then is demodulated by the tape recording formatter unit 11b. The errors in the signal are corrected by the data formatter unit 11a, and then the error corrected reproduced signal is outputted through the input/output unit 10.

However, as shown in FIG. 1, since the recording pattern of the video signal recording/reproducing apparatus of the conventional DVHS VCR is completely different from the recording pattern for an analog video signal, a high density recording/reproducing tape must be exclusively used.

When recording/reproducing a digital video broadcast using the DVHS VCR, since it is only possible to record/reproduce the high density using the SVHS tape, the recording density becomes lowered when using a normal tape for recording/reproducing the analog signal, so that the effective recording/reproducing of the digital signal is difficult.

The recording density difference is related to the recording wavelength of the tape. Generally, in the case of the normal video tape, the effective recording wavelength is about 1.4 $\mu$m, and the effective recording wavelength of the SVHS tape is about 0.8 $\mu$m.

Therefore, as shown in FIG. 1, when recording digital data outputted from the same source, it is possible to record as much as one track on the high density SVHS tape having an effective wavelength of 0.8 $\mu$m. In case of the low density VHS tape having an effective wavelength of about 1.4 $\mu$m, since the recording wavelength is longer, and the region on which the data is recorded is limited, and it is impossible to record as much digital data as one track on the tape.

That is, in the conventional art, a high density video tape must be used for recording and reproducing the digital signal.

In addition, the video tape widely used with the analog VCR can not be used for recording and reproducing the digital signal.

When a user reproduces a digital video signal using the normal video tape in the DVHS VCR after recording the signal in the DVHS VCR, and a desired picture is not displayed, the user may think there is operational error in the VCR or video tape. So as to overcome the above-mentioned problems, when the DVHS VCR is equipped with a VHS recording failure apparatus, the user may think there are operational problems when the signal recorded on the normal video tape is not displayed. That is, the user should carefully operate the system.

SUMMARY OF THE INVENTION

Accordingly, it is an object of the present invention to provide a video signal recording and reproducing apparatus for a digital video cassette tape recorder, which overcomes the problems encountered in the conventional video signal recording and reproducing apparatus for a digital video cassette tape recorder.

It is another object of the present invention to provide a video signal recording and reproducing apparatus for a digital video cassette tape recorder by which it is possible to divide, record and reproduce a digital signal onto multiple tracks based on the amount of data recorded on one track by controlling a recording/reproducing speed and a tape running speed in accordance with a judgement result after judging the type of a video tape having a predetermined recordable wavelength.

To achieve the objects above, there is provided a video signal recording and reproducing apparatus for a digital video cassette tape recorder, which includes a detector for detecting the type of a video tape in accordance with a recordable wavelength of the video tape, a judgement section for judging the type of the tape by receiving a detected tape type signal from the detector, and a controller for controlling a recording and reproducing speed in accordance with the judged tape type.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 3A:
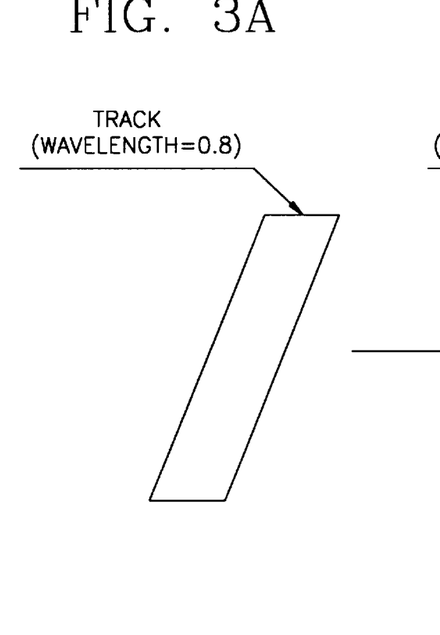
FIG. 3 is a diagram showing an example of a digital data signal of one track of an S-VHS tape being recorded on two tracks of a normal VHS tape according to the present invention.
Figure 3B:
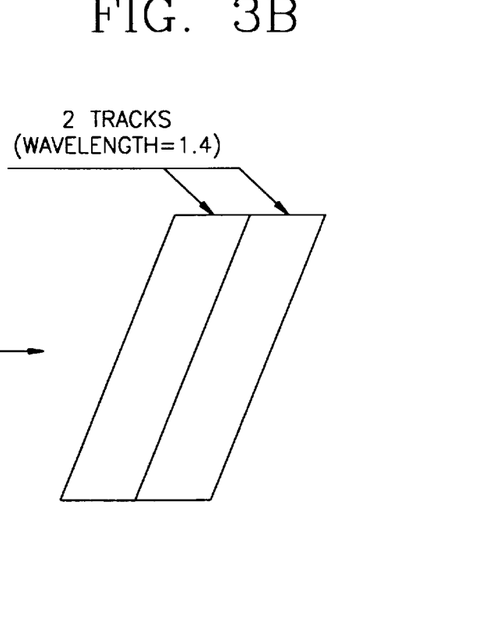

FIGS. 3A and 3B show the format of a digital video signal recorded on a video tape. As shown therein, the digital signal which can be recorded onto one track of a SVHS having a recordable wavelength of 0.8 $\mu$m is divided to two tracks when recorded on a normal VHS tape video having a recordable wavelength of 1.4 $\mu$m.

That is, since the recordable wavelength of the SVHS video tape which is used in the DVHS VCR is 0.8 $\mu$m, and the recordable wavelength of the normal VHS tape video tape which is used in the normal VHS VCR is 1.4 $\mu$m, the digital signal corresponding to one track on the SVHS tape can be divided into two tracks and then recorded on the normal VHS video tape. The digital signal can be recorded on and reproduced from the normal VHS video tape by varying the rotation of the head drum and the tape transferring speed to double speed.

In addition, the control of the track division, the rotation of the head drum, and the running speed of the tape can be made by detecting the type of the tape. The type of the tape is detected as either a high density tape or a low density tape in accordance with its recording wavelength.

When varying the recording and reproducing speed in accordance with the type of the tape, a predetermined ratio should be maintained proportional to the recordable wavelength of the detected tape, and the ratio becomes an integer number of times.

For example, when recording the digital signal, which is can be recorded onto one track of a S-VHS tape having a recordable wavelength of 0.8 $\mu$m, onto a normal tape having a recordable wavelength of 1.4 $\mu$m, since only two tracks are necessary, it is possible to record the digital signal of one track of the S-VHS tape onto two tracks of the normal tape by varying the rotation speed of the head drum and the tape running speed to the 2× normal speed.

Here, in the case of the normal VHS tape, the rotation speed of the head drum is varied from 1800 rpm to 3600 rpm.

Figure 5:
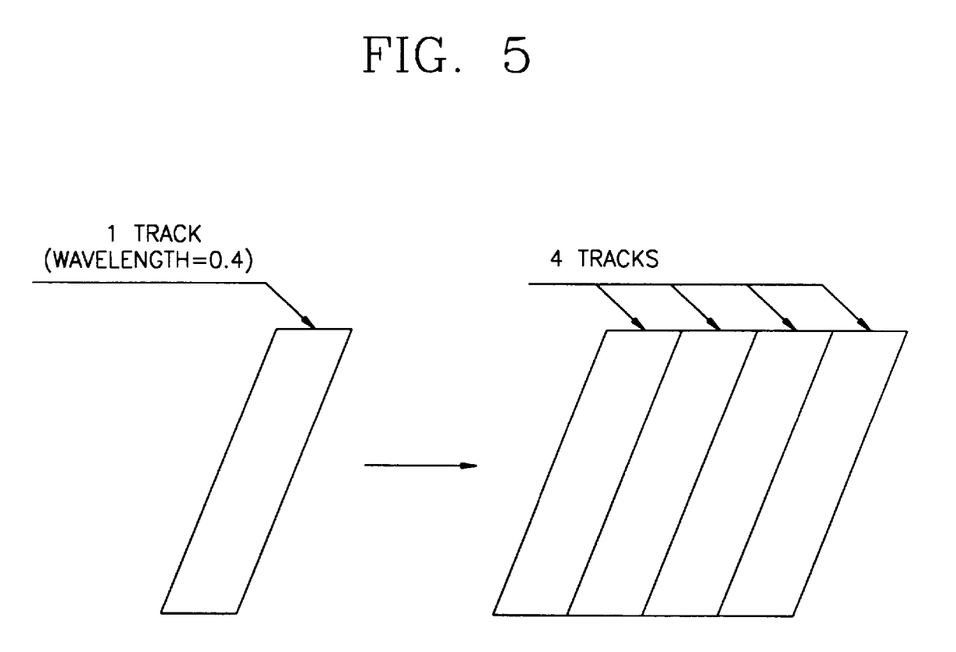
FIG. 5 is a diagram showing an example of a digital data signal of one track of an S-VHS tape being recorded on four tracks of a normal VHS tape according to the present invention.

FIG. 5 shows another example of a format recorded on the video tape. For example, when recording a digital signal of one track of a high density tape having a recordable wavelength of 0.4 μm onto a normal tape having a recordable wavelength of 1.4 μm, such digital signal is recorded onto four tracks of the normal tape, and the rotation speed of the head drum and the running speed of the tape are varied at 4× normal speed, for thus recording the digital signal onto the normal tape.

Figure 4:
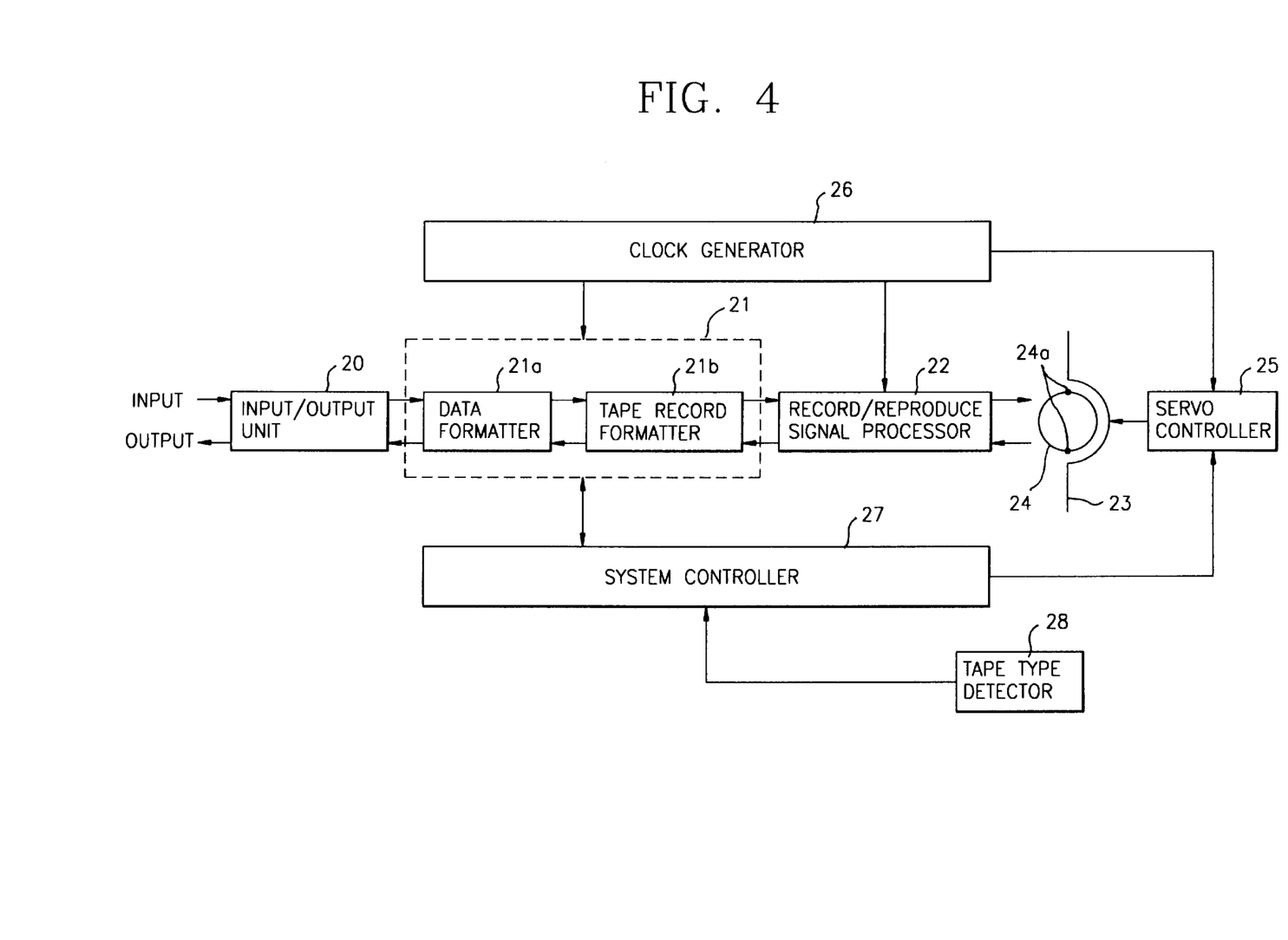
FIG. 4 is a block diagram showing a video signal recording/reproducing apparatus of a DVHS-VCR according to the present invention.

FIG. 4 shows a video signal recording/reproducing apparatus for a digital VCR according to the present invention, which includes an input/output unit 20 connected to the IRD (not shown) for receiving a digital signal to be recorded and for outputting the reproduced digital signal, a format formation unit 21 for converting the inputted digital signal into/from a tape recordable format in accordance with the recording or the reproducing mode and for generating an output signal in the reproducing mode, a record/reproduce signal processor 22 connected to the format formation unit 21 for performing the modulation/demodulation of the digital signal and the record/reproduce processing, a head drum 24 having a video head 24a for recording the record signal outputted from the record/reproduce signal processor 22 onto the video tape 23 or reproducing the recorded digital signal and outputting it to the record/reproduce signal processor 22, a servo controller 25 for controlling the running of the video tape 23 and the rotation of the head drum 24, a clock generator 26 for supplying a format clock signal to the format formation unit 21, a clock signal necessary for recording or reproducing the digital signal to the record/reproduce processor 22, and a reference clock signal for a servo control to the servo controller 15, a system controller 27 for determining the recording mode or the reproducing mode by judging the tape type, generating a system driving clock signal in accordance with the determined mode, and performing system control, and a tape type detector 28 for detecting the type of the video tape 23 and for outputting a detection signal to the system controller 27.

In addition, the format formation unit 21 includes a data formatter unit 21a for generating an error correction code of the inputted data, an additional information (a sub-code) to be recorded, and the like in accordance with the recording mode or the reproducing mode, and a tape recording formatter unit 21b for forming the digital signal into packets recordable on the tape and for generating a recording timing in accordance with the recording mode or the reproducing mode.

The tape type detector 28 includes an optical sensor for detecting a predetermined shaped hole in the cassette shell indicating the type of the tape. When the hole is detected, the currently loaded tape is judged as the S-VHS tape, and when the hole is not detected, the currently loaded tape is detected as the normal tape.

In addition, in the recording mode, the error correction code ECC is detected by recording a small portion of the digital signal on the tape, and in the reproducing mode, the error correction code ECC is detected by reproducing a small portion of the recorded digital signal. When the detected error correction code ECC is larger than the previously set reference value, the current tape is judged as the S-VHS tape, if it is smaller than the reference value, the current tape is judged as the normal tape. So as to obtain the above-mentioned function, an error correction code ECC may be used.

The operation of the video signal recording/reproducing apparatus for a digital VCR according to the present invention will now be explained with reference to FIG. 4.

To begin with, the operation of the video signal recording/reproducing apparatus of the DVHS-VCR will be first explained in the recording mode.

The digital signal outputted from the digital broadcast source is received in the IRD (not shown) and then is inputted to the format formation unit 21 through the input/output unit 20.

Thereafter, the data formatter unit 21a of the format formation unit 21 corrects the errors in the inputted digital signal and generates an additional information (a sub-code) to be recorded, and then outputs the digital signal to the recording formatter unit 21b, and the tape recording format unit 21b forms the inputted digital signal into a packet of a pattern recordable on the video tape 23, generates a recording timing, and outputs the packetized signal to the recording/reproducing signal processor 22.

Here, the format formation unit 21 receives a clock signal necessary for the format formation from the clock generator 26 and a driving clock signal and a control signal (for the generation and a reading-out of the additional data) from the system controller 27, and performs the processing of the data.

The record/reproduce signal processor 22 performs the processing of the recording signal in accordance with the recording clock signal outputted from the clock generator 26 and supplies the processed signal to the video head 24a of the head drum 24, and the servo controller 25 controls the running of the video tape 23 and the rotation speed of the head drum 24, for thus recording the digital signal on the video tape 23.

Therefore, when recording the above-mentioned digital signal on the video tape 23, the rotation speed of the head drum and the running speed of the video tape 23 are controlled in accordance with the judged tape type.

Namely, the tape type detector 28 detects the type of the video tape and then outputs a detection signal to the system controller 27, and the system controller 27 judges whether the current DVHS-VCR is currently in the recording mode or the reproducing mode, receives the detection signal of the tape type detected by the tape type detector 28 and then judges the type of the tape.

For example, it is judged whether the tape currently inserted in the DVHS-VCR is a S-VHS tape having a recordable wavelength of 0.8 μm or a normal VHS tape having a recordable wavelength of 1.4 μm.

As a result, when the tape is judged in the recording mode to be the S-VHS tape, the system controller 27 outputs the control data concerning the speed control of the head drum 24 and the video tape 23 to a servo controller 56 for single speed (1800 rpm), and when the judged tape is the normal VHS tape, the system controller 27 outputs the control data for double speed (3600 rpm), so that the speed of the head drum 24 and the tape can be varied. Here, the speed with respect to the control data is not limited to double speed, but is variable in accordance with the recordable wavelength of the tape.

Therefore, the speed of the head drum 24 and the video tape 23 are controlled at double speed in accordance with the control data for the double(2×) speed operation, and then the digital data of as much as one track pattern of a high density type as shown in FIG. 3A is divided into two tracks as shown in FIG. 3B, and then is recorded on the two tracks of the normal video tape.

Namely, when recording the data recordable on one track of the S-VHS tape having a recordable wavelength of 0.8 μm on the normal tape having a recordable wavelength of 1.4 μm, only two tracks are necessary. The rotation speed of the head drum and the running speed of the tape are varied at double(2×) speed (3600 rpm), and then the digital signal is recorded on two tracks of the normal tape.

Here, since half of the digital data of one high density track is recorded on one of the divided two tracks, there is a certain relativity between the data recorded on the two tracks.

Therefore, the system controller 27 inserts the track position information into the divided track as an information indicating a certain relativity of neighboring tracks by controlling the format formation unit 21 in the recording mode. In addition, in the reproducing mode, the system controller 27 reads-out the recorded track position information and recognizes the information indicating the track relativity, thus achieving a better picture quality by continuously processing the data, and recording and reproducing a clearer and more accurate digital signal.

Namely, in the case of the DVHS-VCR, the signal recorded on a plurality of tracks forms one picture image. A plurality of track signals with respect to the plurality of tracks are concurrently processed by the format formation unit 21. Here, the start point of the divided track data is important since the data divided and recorded on the normal VHS tape becomes part of the data forming one picture, and when inserting the track position information between divided tracks as in the present invention, the signal processing is not easy as an initial stage of the reproducing.

When the video tape 23 works at the normal speed in accordance with the control of the servo controller 25, and the recorded signal is read by the video head 24a as the head drum 24 rotates, the thusly read digital signal is processed by the record/reproduce signal processor 22. Thereafter, the demodulation of the data which is formed into a packet by the recording formatter unit 21b, and the signal processing with respect to the error correction and the like is performed by the data formatter unit 21a and then the reproduce-processed signal is outputted to the input/output unit 20. Here, the reproducing speed is determined and controlled in accordance with the result of the detection result of the tape type.

When reproducing the recorded digital signal, the operation is performed in the reversed order of the recording operation.

Namely, in the reproducing mode, the system controller 27 receives the detection signal from the tape type detector 28. In accordance with the detection signal, it is judged whether the current tape is the S-VHS tape having a recordable wavelength of 0.8 μm or the normal VHS tape having a recordable wavelength of 1.4 μm.

As a result of the judgement, when the type of the tape is the S-VHS tape in the reproducing mode, the system controller 27 supplies control data in relation to the speed of the head drum 24 and the tape to the servo controller 25 for single (1×) speed. When it is the normal tape, the system controller supplies the control data for double (2×) speed (3600 rpm).

In addition, the speed with respect to the control data is not limited to 2× speed, but it is the speed variable in accordance with the recordable wavelength of the tape.

Here, by controlling the speed of the head drum 24 and the tape for reproducing the normal tape at 2× speed, the digital signal in divided into two tracks as shown in FIG. 3B recorded on the normal tape is reproduced.

In addition, the system controller 27 controls the track position information to be reproduced, which indicates a certain relativity of neighboring tracks by controlling the format formation unit 21, and the thusly reproduced track information is read-out in the reproducing mode. Thereafter, the information is divided into a group having the same relativity and then is outputted, thus achieving a clearer and more accurate picture quality.

In addition, as shown in FIG. 5, when recording the data of as much as one track of a high density tape having a recordable wavelength of 0.4 μm on the normal tape having a recordable wavelength of 1.4 μm, the digital data is recorded on four tracks of the normal tape, and the rotation speed of the head drum and the running speed of the tape are controlled at 4× speed, thus recording the digital data on the normal tape.

As described above, the video signal recording and reproducing apparatus for a digital video cassette tape recorder is directed to recording the digital signal and reproducing the recorded digital signal using a high density video tape as well as a low density video tape.

In addition, when the video tape is inserted, the type of the video tape is automatically detected. As a result of the detection, a proper recording and reproducing speed is automatically determined so as to prevent loss of data, so it is very convenient to use.

Moreover, since it is possible to record the digital signal on a normal video tape and to reproduce the thusly recorded digital signal, the tape compatibility is enhanced.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A video signal recording and reproducing apparatus for a digital video cassette tape recorder, comprising:

means for detecting the type of a video tape loaded in a digital video cassette tape recorder in accordance with a recordable wavelength of a video tape magnetic recording medium on which a digital signal is recordable and generating a detected tape type signal in accordance with the detection;

means for judging the type of the tape in accordance with the detected tape type signal;

means for dividing the data of a digital video signal recordable on one track of a high density type tape into multiple tracks when the judged tape type is a normal VHS tape; and means for controlling a recording and reproducing speed of the digital video cassette recorder in accordance with the type of the judged tape type.

2. The apparatus of claim 1, wherein said means for controlling the recording and reproducing speed variably controls the recording and reproducing speed in proportion to the recordable wavelength of the tape or the number by which the tracks are divided into multiple tracks.

3. The apparatus of claim 1, wherein said means for controlling the recording and reproducing speed controls the rotation speed of a head drum and the running speed of the tape in proportion to the number by which the tracks are divided into multiple tracks.

4. A video signal recording and reproducing apparatus for a digital video cassette tape recorder, comprising:

means for detecting the video type loaded in a video cassette recorder in respect of the amount of data of a digital video signal recordable on one track of a high density type tape and generating a detected tape type signal in accordance therewith;

means for judging whether the loaded video tape is a first tape type on which a digital video signal is recordable all on one track thereof or a second tape on which the digital video signal is not all recordable on one track thereof in accordance with the detected tape type signal;

means for dividing the data of a digital video signal corresponding to the amount of data recordable on one track of a high density type video tape and then recording/reproducing the data into multiple tracks when as a result of the judgement, the loaded video tape is judged to be the second tape type; and wherein the means for dividing the data into multiple tracks responds when the judged tape type is a normal VHS tape.

5. The apparatus of claim 4, further comprising means for varying a running speed of the tape and a rotation speed of a drum in proportion to the number of dividing tracks, when said dividing means divides the data into multiple tracks.

6. The apparatus of claim 4, wherein when as a result of the judgement, the loaded tape is judged to be the first tape type, a running speed of the tape is set at a first speed, and when it is judged the second tape type, the running speed of the tape and a rotation speed of a head drum are set at a second high speed.

7. A video signal recording and reproducing apparatus for a digital video cassette tape recorder, comprising:

means for detecting the type of a video tape in accordance with a recordable wavelength of the video tape in the recording or reproducing mode and for generating a detected tape type signal in accordance therewith;

means for judging the type of the tape in accordance with the detected tape type signal;

means for dividing the data of a digital video signal recordable on one track of a high density type tape into multiple tracks when the judge tape type is normal VHS tape; and means for controlling a recording speed of the video cassette recorder in accordance with the judged tape type.

8. The apparatus of claim 7, wherein said means for controlling variably controls the speed in proportion to the recordable wavelength of the tape or the number by which the tracks are divided into multiple tracks.

9. The apparatus of claim 7, wherein said means for controlling varies a running speed of the tape in proportion to the number by which the tracks are divided into multiple tracks the recordable wavelength of the tape and a rotation speed of a head drum in accordance with the varied running speed of the tape.

10. A video signal recording and reproducing apparatus for a digital video cassette tape recorder, comprising:

means for detecting the type of a video tape loaded in the video cassette recorder in accordance with a recordable wavelength of the video tape and for generating a detected tape type signal in accordance with said detection;

means for judging the type of the tape in accordance with the detected tape type signal;

means for dividing the data of a digital video signal recordable on one tracks of a high density type tape into multiple tracks when the judged tape type is normal VHS tape; and means for varying a reproducing speed of the video tape in accordance with the judged tape type.

11. The apparatus of claim 10, wherein said means for varying varies the reproducing speed in proportion to the recordable wavelength of the tape or the number by which the tracks are divided into multiple tracks.

12. The apparatus of claim 10, wherein said means for varying controls a rotation speed of a head drum and a running speed of the tape in proportion to the number by which the tracks are divided into multiple tracks.

13. A video signal recording and reproducing apparatus for a digital video cassette tape recorder, comprising:

means for detecting the type of a tape loaded in the video cassette recorder in accordance with a recordable wavelength of the video tape among a video tape type on which data amounting to a digital video signal recordable on one track of a high density type tape is recorded and divided in multiple tracks and in which a track position information indicating a relativity between data recorded on a plurality of tracks is recorded, and for generating a detected tape type signal in accordance with the detected tape type signal; and means for judging the type of a tape by receiving the detected tape type signal; and means for reading out the track position information, binding the data having the same relativity between the divided tracks when the judged tape type is a normal VHS tape; and processing to the data mounting to a digital video signal recordable on one track of the high density type tape.

14. An apparatus for recording and reproducing a digital video signal on a variety of tapes including a digital tape and a normal VHS tape, in which a digital video signal recordable on one track of a high density type tape is divided into multiple tracks when the tape type is the normal VHS tape, the apparatus comprising:

a detecting circuit for detecting the type of video tape loaded in a digital video cassette tape recorder, in accordance with a recordable wavelength of the video tape;

a tape speed controller for controlling the tape speed to run at a first speed if the tape is a digital tape and a second speed if the tape is a normal VHS tape; and a data controlling circuit for recording and reproducing a video signal on the tape in accordance with a first format when the tape has been detected to be a digital tape and in accordance with a second format when the tape has been detected to be a normal VHS tape.

15. The apparatus of claim 14, in which the digital tape has a recording wavelength of about 0.8 micrometers and the normal VHS tape has a recording wavelength of about 1.4 micrometers, the first speed is 1800 rpm and the second speed is about 3600 rpm.

16. The apparatus of claim 14, in which the video signal is recorded on a single track in the case of the digital video tape and on a pair of tracks in the case of the normal VHS tape.

17. The apparatus of claim 14, in which the video signal is recorded on a single track in the case of the digital video tape and on four tracks in the case of the normal VHS tape.

18. The apparatus of claim 14, in which the detecting circuit includes an optical sensor for detecting a predetermined, shaped hole in a cassette shell of the tape, which shaped hole indicates the type of the tape.

19. The apparatus of claim 14, in which the detecting circuit includes circuitry for recording a small portion of the digital signal on the tape and in a reproducing mode for detecting an error correction code (ECC) and determining which tape is used based on the value of the detected error correction code (ECC) relative to a predetermined reference value.

20. The apparatus of claim 14, in which the apparatus includes a circuit for recording on the tape information indicating a relatedness of neighboring track pairs.

* * * * *